(12) United States Patent
Coleman et al.

(10) Patent No.: US 8,508,773 B2
(45) Date of Patent: Aug. 13, 2013

(54) MEDIA ACCESS CONTROL ADDRESS INSTALLATION FOR TANDEM PRINT ENGINE CONFIGURATIONS

(75) Inventors: Russell A. Coleman, West Henrietta, NY (US); Carlos O. Alva, Penfield, NY (US); Rui Amorim, Fiarport, NY (US)

(73) Assignee: Xerox Corporation, Norwalk, CT (US)

( * ) Notice: Subject to any disclaimer, the term of this patent is extended or adjusted under 35 U.S.C. 154(b) by 707 days.

(21) Appl. No.: 12/639,309

(22) Filed: Dec. 16, 2009

(65) Prior Publication Data

US 2011/0141512 A1 Jun. 16, 2011

(51) Int. Cl.
*G06F 3/12* (2006.01)
*G06F 15/177* (2006.01)
*G06F 15/173* (2006.01)
*G06F 15/16* (2006.01)
*G06F 3/00* (2006.01)
*H05K 7/10* (2006.01)

(52) U.S. Cl.
USPC .......... 358/1.15; 709/220; 709/221; 709/222; 709/223; 709/228; 709/229; 709/236; 710/3; 710/8; 710/9; 710/10; 710/301

(58) Field of Classification Search
None
See application file for complete search history.

(56) References Cited

U.S. PATENT DOCUMENTS

| | | | |
|---|---|---|---|
| 4,283,773 A | 8/1981 | Daughton | |
| 4,314,334 A | 2/1982 | Daughton | |
| 6,438,625 B1* | 8/2002 | Olson | 710/9 |
| 2003/0018804 A1* | 1/2003 | Laxman et al. | 709/236 |
| 2005/0052927 A1* | 3/2005 | Barrieau | 365/222 |
| 2006/0268316 A1* | 11/2006 | Condon et al. | 358/1.15 |
| 2007/0182984 A1 | 8/2007 | Ragnet et al. | |

* cited by examiner

*Primary Examiner* — King Poon
*Assistant Examiner* — Vincent Peren
(74) *Attorney, Agent, or Firm* — Fay Sharpe LLP (57) ABSTRACT

The present disclosure provides a method of assigning media access control (MAC) addresses to image paths for a printing system. The method comprises: initializing a MAC address to each image path board in the printing system wherein the printing system includes at least two print engines each having an image path board; modifying a card cage enclosure to include a bit selector for each image path board; and, creating a unique IP address for each MAC address including generating a unique octet for each MAC address. A slot ID is used for the generating of the unique octet for each MAC address having a standard base value.

6 Claims, 7 Drawing Sheets

MEDIA ACCESS CONTROL ADDRESS INSTALLATION FOR TANDEM PRINT ENGINE CONFIGURATIONS

BACKGROUND

In computer networking, a Media Access Control (MAC) address is a unique identifier assigned to most network adapters or network interface cards (NICs) by the manufacturer for identification, and used in the Media Access Control protocol sublayer. If assigned by the manufacturer, a MAC address usually encodes the manufacturer's registered identification number. It may also be known as an Ethernet Hardware Address (EHA), hardware address, adapter address, or physical address.

There are three numbering spaces, managed by the Institute of Electrical and Electronics Engineers (IEEE), which are in common use for formulating a MAC address: MAC-48, EUI-48, and EUI-64. The "EUI" stands for Extended Unique Identifier.

Although intended to be a permanent and globally unique identification, it is possible to change the MAC address on most of today's hardware, an action often referred to as MAC spoofing. Unlike Internet Protocol (IP) address spoofing, where a sender spoofing their address in a request tricks the other party into sending the response elsewhere, in MAC address spoofing (which takes place only within a local area network), the response is received by the spoofing party.

In a network system wherein modules are integrated in a tandem or other integrated configuration that use at least two sets of image path boards, the image path boards do not have unique MAC addresses and therefore cannot communicate independently with the Program and Systems Information Protocol (PSIP).

BRIEF DESCRIPTION

The present disclosure provides a method of assigning media access control (MAC) addresses to image paths for a printing system. The method comprises: initializing a MAC address to each image path board in the printing system wherein the printing system includes at least two print engines each having an image path board.

Modifying a card cage enclosure to include a bit selector for each image path board; and, creating a unique IP address for each MAC address including generating a unique octet for each MAC address. A slot ID is used for the generating of the unique octet for each MAC address having a standard base value.

In another aspect, the disclosure provides a method of assigning media access control (MAC) addresses to image paths for a printing system. The method comprises initializing a MAC address to each image path board in the printing system wherein the printing system includes at least two print engines each having an image path board, wherein the initializing of the MAC address creates identical MAC addresses for each of the at least two print engines. The method further comprises: modifying a card cage of each image path board wherein each image path board includes a discreet component with programmable logic; creating a unique slot ID from the programmable logic; and, creating a unique MAC address having a unique octet from the unique slot ID.

In still another aspect, the disclosure provides a method of assigning media access control (MAC) addresses to image paths for a printing system. The method comprises initializing a MAC address to each image path board in the printing system wherein the printing system includes at least two print engines each having an image path board, wherein the initializing of the MAC addresses includes a router for isolating redundant MAC addresses. The method further comprises: using the router for creating unique engine MAC addresses derived from associated slot ID's for each image path board; assigning each the IP address for each the image path board based one respective the MAC address wherein an extension is added to each the IP address, wherein each IP address is unique for differentiating each print engine from all other print engines. The method still further comprises decoding each the IP address and generating another MAC address for each image path board based on the decoded IP address.

DETAILED DESCRIPTION

In transmission control protocol/internet protocol (TCP/IP) networks, the MAC address of a subnet interface can be queried with the IP address using the Address Resolution Protocol (ARP) for Internet Protocol Version 4 (IPv4) or the Neighbor Discovery Protocol (NDP) for IPv6. On broadcast networks, such as Ethernet, the MAC address uniquely identifies each node and allows frames to be marked for specific hosts. It thus forms the basis of most of the Link layer (OSI Layer 2) networking upon which upper layer protocols rely to produce complex, functioning networks.

Figure 7:
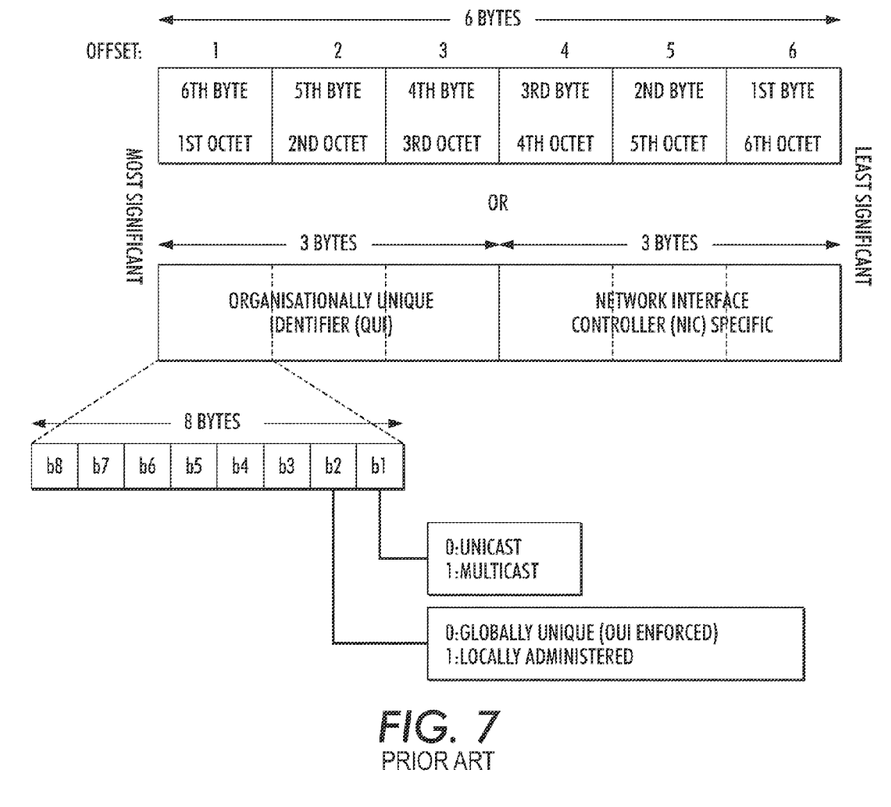

The standard (IEEE 802) format for printing MAC-48 addresses in human-friendly form is six groups of two hexadecimal digits, separated by hyphens (−) or colons (:), in transmission order, e.g. 01-23-45-67-89-ab, 01:23:45:67:89:ab. This form is also commonly used for EUI-64. (Refer to FIG. 7)

The original IEEE 802 MAC address comes from the original Xerox Ethernet addressing scheme. This 48-bit address space contains potentially $2^{48}$ or 281,474,976,710,656 possible MAC addresses.

All numbering systems use the same format and differ only in the length of the identifier. It is to be appreciated that addresses can either be "universally administered addresses" or "locally administered addresses."

A universally administered address can be uniquely assigned to a device by its manufacturer; these are sometimes called "burned-in addresses" (BIA). The first three octets (in transmission order) identify the organization that issued the identifier and are known as the Organizationally Unique Identifier (GUI). The following three (MAC-48 and EUI-48) or five (EUI-64) octets are assigned by that organization in nearly any manner they please, subject to the constraint of uniqueness. A locally administered address can be assigned to a device by a network administrator, overriding the burned-in address. Locally administered addresses do not contain OUIs.

Universally administered and locally administered addresses can be distinguished by setting the second least significant bit of the most significant byte of the address. If the bit is 0, the address is universally administered. If the bit is 1, the address is locally administered. In the example address 02-00-00-00-00-01 the most significant byte is 02 (hex). The binary is 00000010 and the second least significant bit is 1. Therefore, it is a locally administered address. The bit is 0 in all OUIs.

If the least significant bit of the most significant byte is set to a 0, the packet is meant to reach only one receiving NIC. This is called unicast. If the least significant bit of the most significant byte is set to a 1, the packet is meant to be sent only once but still reach several NICs. This is called multicast.

The distinction between EUI-48 and MAC-48 identifiers is purely semantic: MAC-48 is used for network hardware; EUI-48 is used to identify other devices and software. Thus, by definition, an EUI-48 is not in fact a "MAC address", although it is syntactically indistinguishable from one and assigned from the same numbering space.

The IEEE now considers the label MAC-48 to be an obsolete term which was previously used to refer to a specific type of EUI-48 identifier used to address hardware interfaces within existing 802-based networking applications and should not be used in the future. Instead, the term EUI-48 should be used for this purpose.

The IEEE has built in several special address types to allow more than one network interface card to be addressed at one time:

These are "group addresses", as opposed to "individual addresses"; the least significant bit of the first octet of a MAC address distinguishes individual addresses from group addresses. That bit is set to 0 in individual addresses and 1 in group addresses. Group addresses, like individual addresses, can be universally administered or locally administered.

In an integrated print system wherein each print engine is the same, each associated control board will be the same, thus, when a card cage is put in one position or, when a card cage is assembled with a board, they will all have the same MAC addresses. Therefore, if a card cage is put together in the same network there will exist two nodes with the same MAC address, and the address resolution presents a problem.

In another illustrative example, i.e. in a networked printing system, the IP addresses can be basically assigned to boards in a card cage and each board can have a unique IP address based on location in the card cage. The IP addresses need to be different when two print engines, for example iGen® printers, registered trademark of Xerox Corporation, are installed back to back. In a tandem configuration, iGen® printer number 1 would be driving paper into iGen® printer number 2. In iGen® printer number 1, a card cage exists that has a resultant IP address that is identical to the IP and MAC addresses that are in iGen® printer number 2.

With reference now to FIGS. 1-6, a system will be described hereinbelow for assigning unique IP addresses. The present disclosure provides methods to automatically configure a second iGen® printer, for example, with different IP addresses using a uniquely created MAC address.

In one arrangement (FIGS. 1 and 2), by using a combination of an external switch and slot ID (interconnection point), unique MAC addresses can be assigned to image path and control boards residing in a dual card cage configuration. Upon system initialization, all modules can be assigned IP addresses based on their respective MAC addresses.

Figure 1:
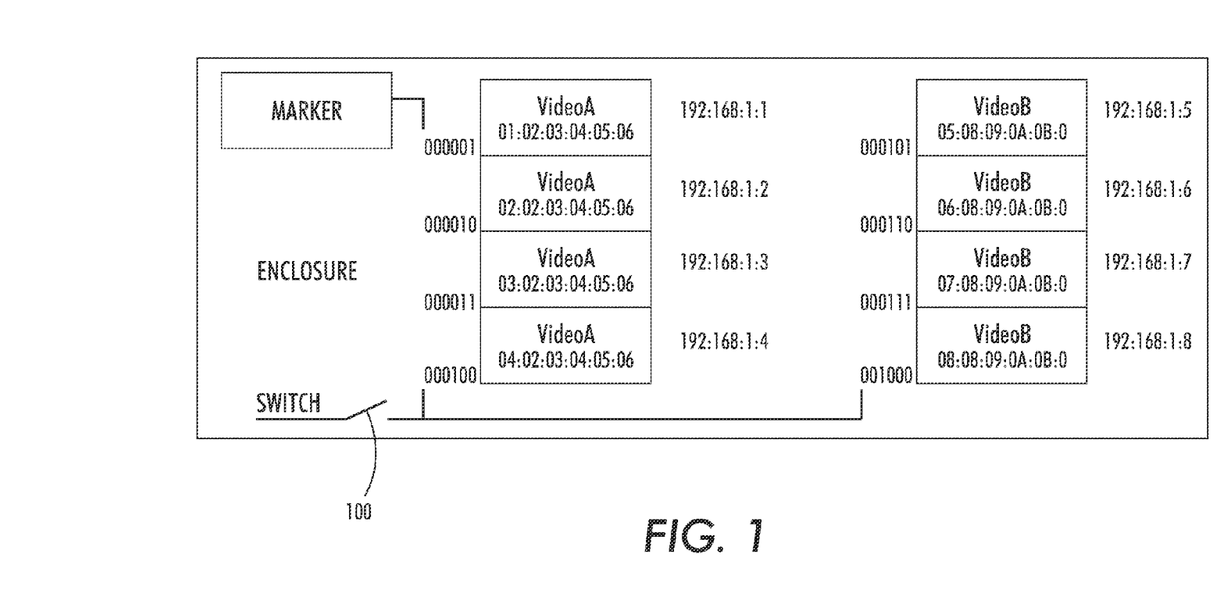
FIG. 1 is one exemplary arrangement of MAC and IP addresses for boards within an enclosure and modules within integrated print engines.
Figure 2:
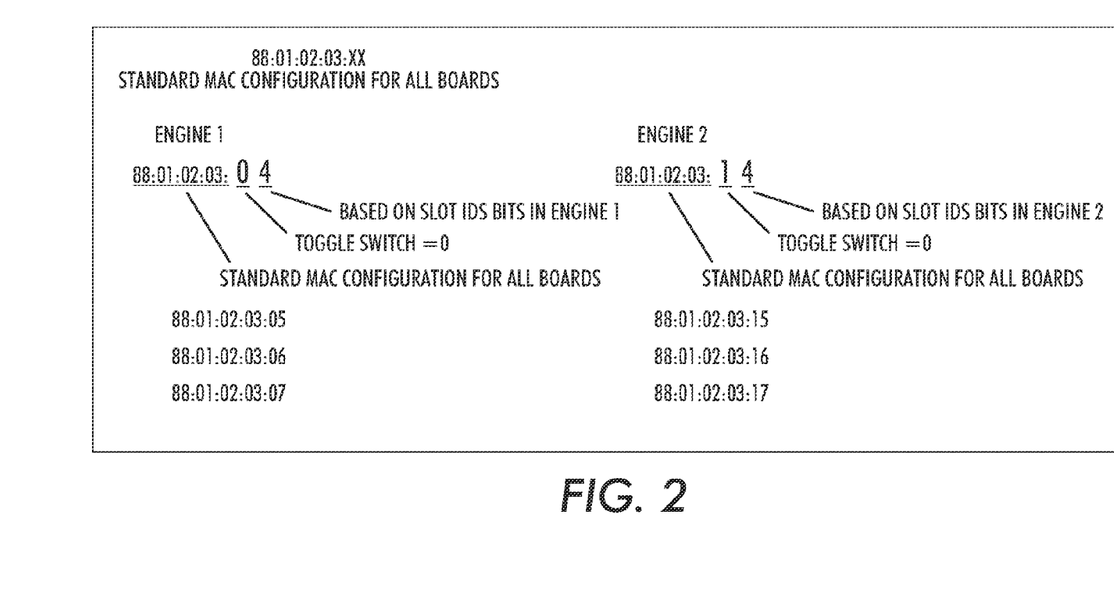
FIG. 2 is an exemplary assignment of a unique MAC address comprising a toggle switch and a slot ID.

The present disclosure proposes using a combination of an external switch and slot ID values to assign unique MAC addresses to image path and control boards residing in dual card cages within a tandem print engine, or similar configuration. During system initialization, all modules that use Ethernet to communicate can be assigned an IP address based on their respective MAC addresses. Since image and control hardware (HW) are interchangeable and identical, uniqueness does not exist in a tandem configuration. The MAC addresses for each engine are identical. Thus, a novel adaptation of the existing card cage enables unique MAC addresses to be created from identical and interchangeable HW.

The marker and image path hardware associated with digital-presses resides in a custom enclosure. This hardware controls image path logic and initiates the printing process. Circuit boards that are specific to controlling video path logic and marker software (SW) are inter-connected with various modules with a digital-press using an Ethernet interface housed with the custom enclosure.

SW processes operating on individual boards within the enclosure can communicate with various print engine modules and one another via Ethernet packets transmitted from an initiator to a receiver. Packets are routed from a source to a destination based on an IP address that is bound to a unique MAC address associated with each board. Within the video path (which may be embedded within the enclosure), a given board may be responsible for image processing a given color separation and can be identical in form, fit, function and MAC address to a board responsible for image processing any other color separation within the enclosure. Therefore, assigning a unique MAC address to enable communications becomes problematic for various components within the enclosure.

According to one embodiment, each card within the enclosure can take advantage of unique interconnection points embedded within the enclosure to enable assignment of a unique MAC address for boards within the enclosure. For example, all Video A circuit boards can have a MAC address defined as 01:02:03:04:05:06. This address will be combined with interconnects embedded in the enclosure by logic internal to Video A. Internal logic on each circuit board can modify its MAC address based on the interconnect value assigned to each card to form a unique MAC address. An IP address can then be associated with each unique MAC address for boards within the enclosure to enable communications between modules on the digital-press.

When dual digital-presses are interconnected in a tandem configuration, two enclosures are required for each engine. Since each custom enclosure is identical in form, fit, and function, a unique IP address can no longer be assigned to various cards within each enclosure. For example, the IP addresses for boards within Engine1-enclosureA will be identical to those in Engine 2-enclosureB. Therefore, an extension can be introduced to ensure that unique interconnect points within Engine1-enclosureA shall differ from interconnect points within Engine2-enclosureB.

Each enclosure can incorporate a switch 100 located on the outside of the enclosure (i.e., external switch) which can cause the most-significant bit of the interconnect points within an enclosure to either read high or low. Further, the external switch can enable and drive logic on I/O ports to mimic unique interconnect points on other boards within the enclosure. This enablement can allow identical boards in Engine 1-enclosureA and Engine 2-enclosureB to have unique MAC and IP addresses. The aforementioned enables communication between boards within the enclosures and modules within tandem or integrated print engines.

Illustratively, for a simple mechanism having two identical card cages, one in iGen® printer one and the other in iGen® printer two, all the card sets are identical and therefore all of the IP and MAC addresses are identical. The above described method, in iGen® printer number 2, alters the external switch and forces the MAC address to be different on the card in iGen® printer number two. Each card in the card cage resides or lives in a particular slot, be it slot number 1, slot number 2, slot number 3, and so on and so forth. In the second iGen® printer placement of the card into a slot and the switch that alters the slot ID in the second card cage, enables the slot ID to become unique and different relative to the slot ID in the first card cage. Based on those new slot ID's, one can compute or generate new MAC addresses and therefore new IP addresses for those cards in the second iGen® printer. Once unique MAC addresses and IP addresses have been created, the board can be configured accordingly. Without the mechanism for creating unique IP addresses, it would not be possible to distinguish between the print engines iGen® printer number one and iGen® printer number two. A further distinction that has developed from the present disclosure is that if one engine has already been installed and another engine is then installed next to it, by the mere fact of being engine two connected to engine one, the unique IP addresses will be derived automatically, hence eliminating the need for the external switch.

In another arrangement (FIGS. 3 and 4), by using a combination of a slot ID (interconnection point) and an external logic module 200 attached to each board, unique MAC addresses can be assigned to image path and control boards residing in a dual card cage configuration. Upon system initialization, all modules can be assigned IP addresses based on their respective MAC addresses.

Figure 3:
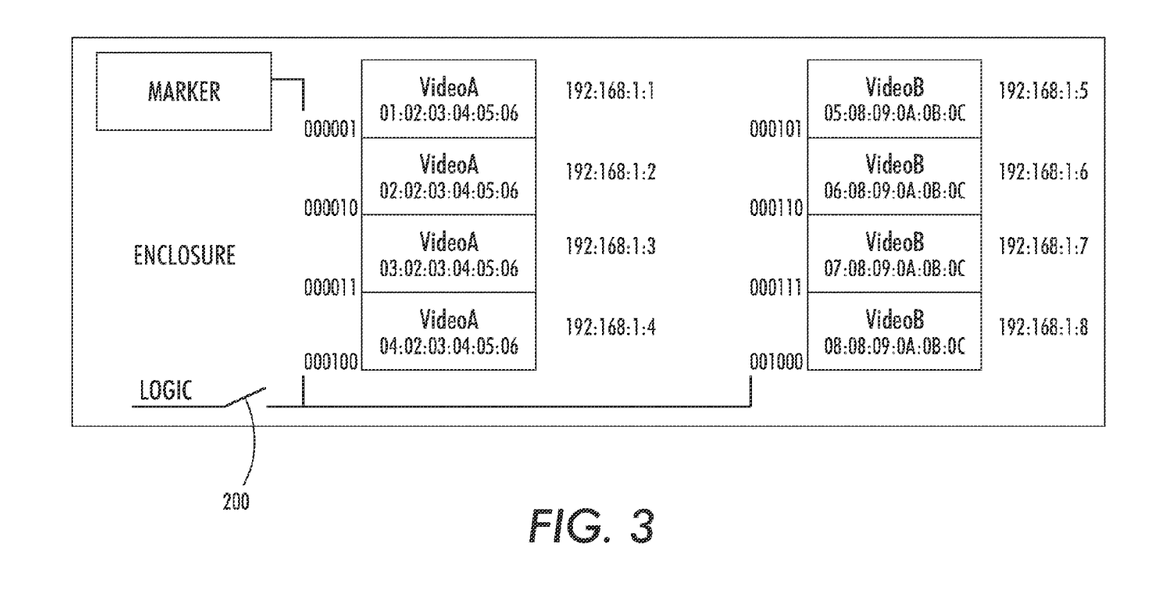
FIG. 3 is another exemplary arrangement of MAC and IP addresses for boards within an enclosure and modules within integrated print engines.
Figure 4:
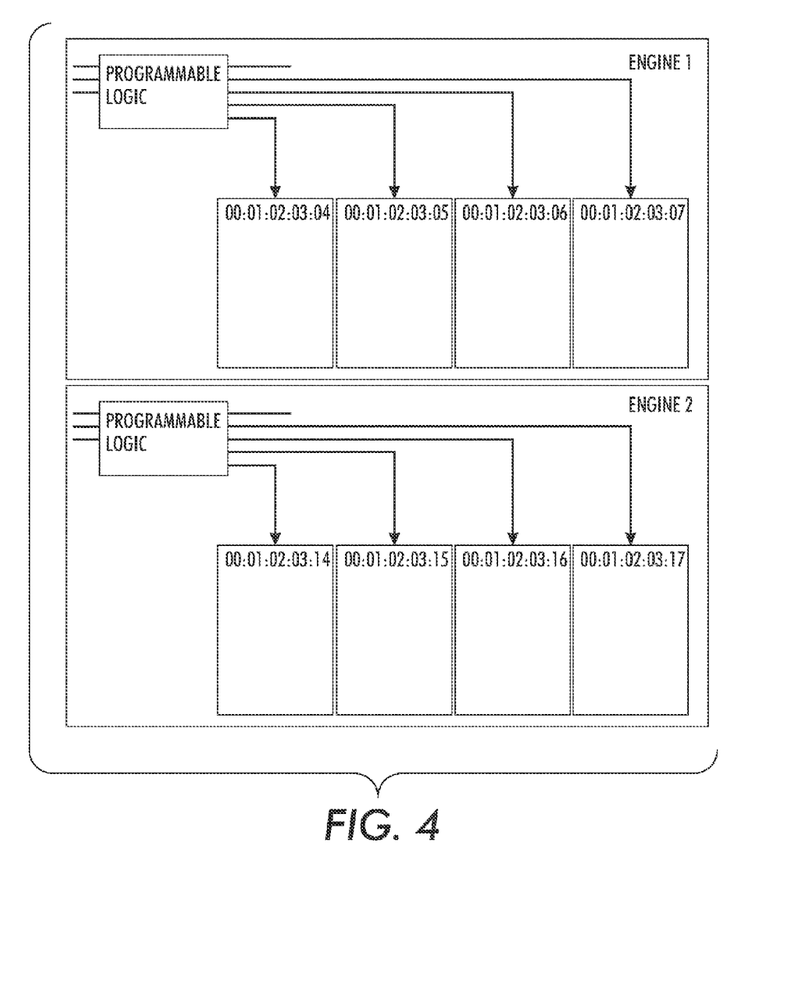
FIG. 4 is still another exemplary arrangement of MAC addresses comprising external logic.

In a tandem configuration, one enclosure can incorporate a logic module that shall be mounted to an I/O port on each card in the enclosure. The logic module's presence will be sensed by circuits that will generate a MAC address based on interconnect values and the module. This enablement shall allow identical boards n Engine1-enclosureA and Engine2-enclosureB to have unique MAC and IP addresses. This will enable communication between boards within the enclosures and modules within tandem or integrated print engines.

SW processes operating on individual boards within the enclosure can communicate with various print engine modules and one another via Ethernet packets transmitted from an initiator to a receiver. Packets are routed from a source to a destination based on an IP address that is bound to a unique MAC address associated with each board. Within the video path (which may be embedded within the enclosure), a given board may be responsible for image processing a given color separation and can be identical in form, fit, function and MAC address to a board responsible for image processing any other color separation within the enclosure. Therefore, assigning a unique MAC address to enable communications becomes problematic for various components within the enclosure.

According to still another arrangement, (FIGS. 5 and 6) in a tandem print engine configuration, one enclosure can incorporate a logic module 300 that can be mounted to an I/O port on each card in the enclosure. The logic module's presence can be sensed by circuits that can generate a MAC address based on interconnect values and the module. This enablement shall allow identical boards in Engine1-enclosureA and Engine2-enclosureB to have unique MAC and IP addresses. This can enable communication between boards within the enclosures and modules within tandem or integrated print engines.

Figure 5:
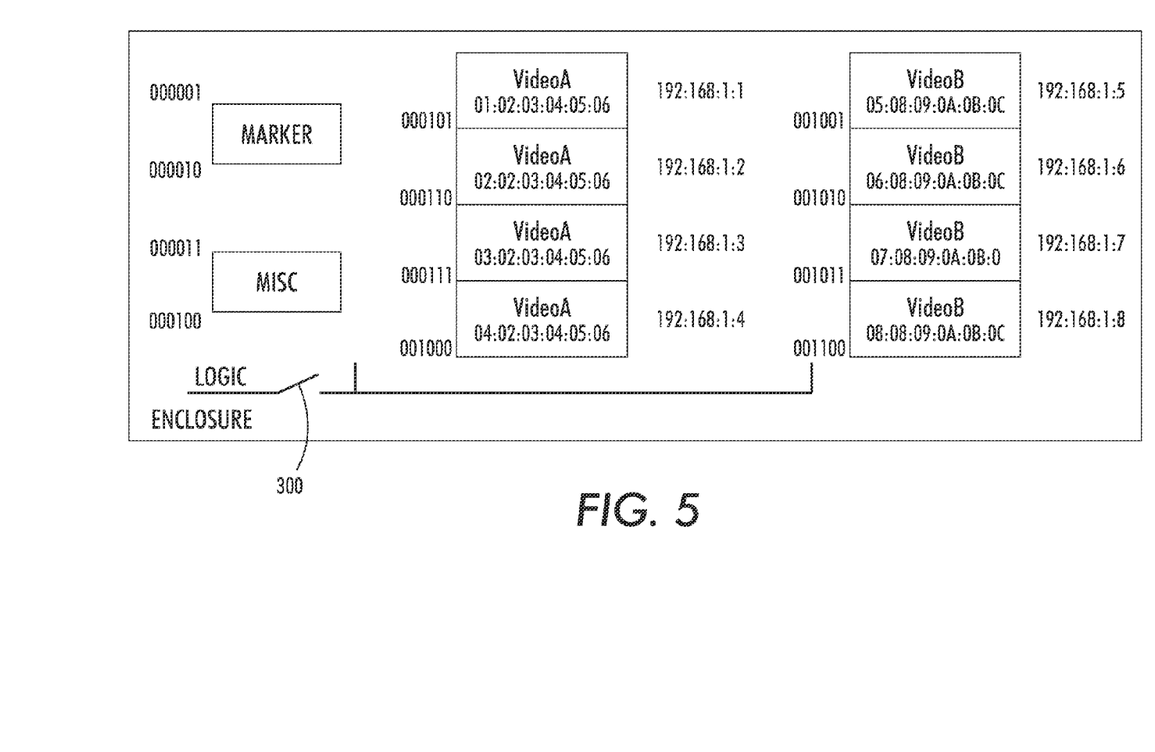
FIG. 5 is yet still another exemplary arrangement of MAC addresses for boards within an enclosure and modules within integrated print engines.
Figure 6:
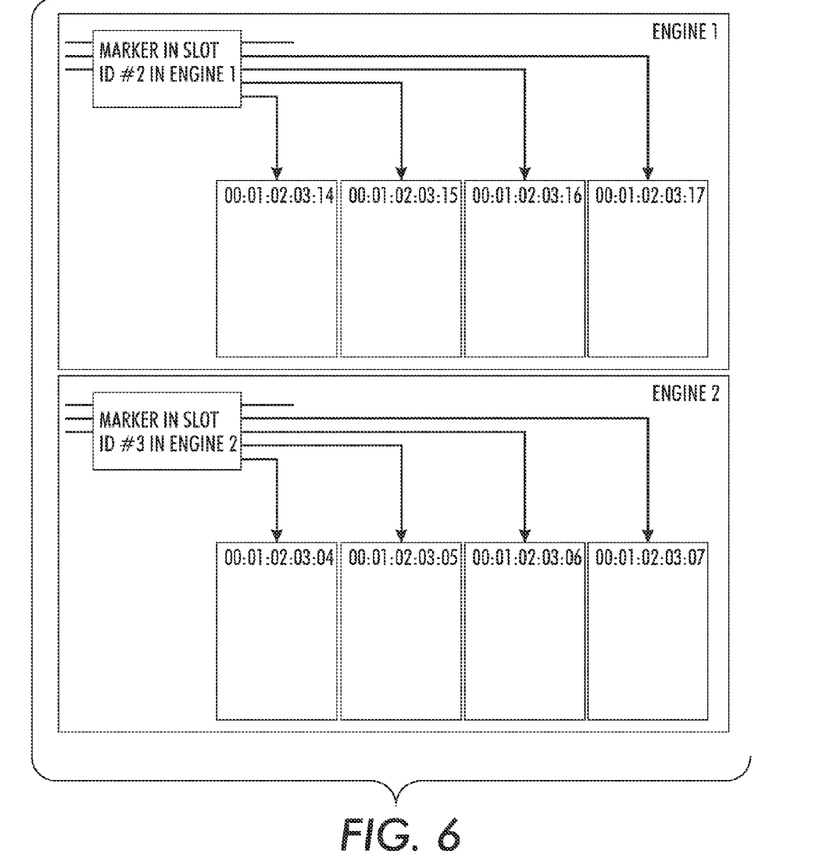
FIG. 6 is yet still another exemplary arrangement of MAC addresses comprising marker presence and slot IDs; and, FIG. 7 is the standard (IEEE 802) format for printing MAC-48 addresses in human-friendly form.

By using a combination of internal logic and a modified slot ID, unique MAC addresses can be assigned to image path and control boards residing in a dual card cage configuration. Upon system initialization, all modules can be assigned IP addresses based on their respective MAC addresses.

The present disclosure proposes using a combination of internal logic and modified slot ID values to assign unique MAC addresses to image path and control boards residing in dual card cages within a tandem or integrated network, or similar, configuration. During system initialization, all modules that use Ethernet to communicate are assigned an IP address based on their respective MAC addresses. Since image and control HW are interchangeable and identical, uniqueness does not exist in a tandem configuration. The MAC addresses for each engine are identical. A novel adaptation of the existing card cage enables unique MAC addresses to be created from identical and interchangeable HW.

The marker and image path hardware associated with digital-presses resides in a custom enclosure. This hardware controls image path logic and initiates the printing process. Circuit boards that are specific to controlling video path logic and marker SW are inter-connected with various modules with a digital-press using an Ethernet interface housed within the custom enclosure.

SW processes operating on individual boards within the enclosure communicate with various print engine modules and one another via Ethernet packets transmitted from an initiator to a receiver. Packets are routed from source to destination based on an IP address that is bound to a unique MAC address associated with each board. Within the video path (which may be embedded within the enclosure), a given board may be responsible for image processing a given color separation and can be identical in form, fit, function and MAC address to a board responsible for image processing any other color separation within the enclosure. Therefore, assigning a unique MAC address to enable communications becomes problematic for various components within the enclosure.

Each card within the enclosure shall take advantage of unique interconnection points embedded within the enclosure to enable assignment of a unique MAC address for boards within the enclosure. For example, all VideoA circuit boards have a MAC address defined as 01:02:03:04:05:06. This address will be combined with interconnects embedded in the enclosure by logic internal to VideoA. Internal logic on each circuit board can modify its MAC address based on the interconnect value assigned to each card to form a unique MAC address. An IP address will be associated with each unique MAC for boards within the enclosure to enable communications between modules on the digital-press.

When dual digital-presses are interconnected in a tandem configuration, two enclosures are required for each engine. Since each custom enclosure is identical in form, fit, and function a unique IP addresses can no longer be assigned to various cards within each enclosure. The IP addresses for boards within Engine1-enclosureA will be identical to those in Engine2-enclosureB. Therefore, an extension shall be introduced to ensure that unique interconnect points within Engine1-enclosureA shall differ from interconnect points within Engine2-enclosureB.

In a tandem configuration, only one enclosure shall incorporate a marker operating in a slot corresponding to slot ID 00010. When a marker operates in slot 00010, logic within the enclosure automatically sets the MSB of the remaining interconnect bits high. Logic on each card can decode interconnect bits and can generate a unique MAC address based on those values. This enablement shall allow identical boards in Engine1-enclosureA and Engine2-enclosureB to have unique MAC and IP addresses. This will enable communication between boards within the enclosures and modules within tandem or integrated print engines.

As described above, one solution for assigning unique MAC addresses proposes creating independent sub-networks by means of using a router. The router can provide the internal type of ID of the switch and interconnections between the card cage, but from the exterior it will look like one node. That way, when the local networks are configured by a router and connected to the main network they will look like independent nodes. Each node can be programmed to have a specific signature so the PSIP will be able to reconnect to detect some configurations. That way if the traffic is directed to one of the boards in a card cage from engine one will have a base address leaving the last Octet to be open for the selection of the board in the card cage of that engine. Likewise, for the second engine. This change will replicate for multiple systems or multiple integrated print engines. In this manner the system enables multiple engines to be front ended by a specific offset address or hosted by the router in isolating an internal network which acts as the 'bridge' to the outside world. It is to be appreciated that the aforementioned can be implemented without changing any of the hardware or the card cages.

In addition to the above description, it is to be appreciated that from the isolation provided by the router, the internal logic can be built into the system so that it becomes part of the card cage of the engine itself. Thus, at the time the boards are installed, a card can be built into the card cage that is connected. In this manner, one can assign a front end IP, obtain a MAC address to the card cage itself, and have the modules inside derive work from a pseudo-router now built into the internal logic. The old MAC addresses and IP addresses can be given a sub network. External logic provided by slot IDs in the card cage can facilitate this confirmation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of assigning media access control (MAC) addresses to image paths for a printing system, said method comprising:
    initializing a MAC address to each image path board in the printing system wherein said printing system includes at least two print engines each having an image path board;
    wherein said initializing of said MAC address creates identical MAC addresses for each said print engine;
    wherein said initializing of said MAC addresses includes a router for isolating redundant MAC addresses;
    using said router for creating unique engine MAC addresses derived from associated slot ID's for each image path board;
    assigning each said IP address for each said image path board based on respective said MAC address wherein an extension is added to each said IP address;
    each said IP address is unique for differentiating each print engine from all other print engines; and,
    decoding each said IP address and generating another MAC address for each image path board based on the decoded IP address.

2. The method as set forth in claim 1, wherein said router creates a local network with the unique engine MAC addresses derived from engine ID programmable logic.

3. The method as set forth in claim 1, wherein said router creates a local network with the unique engine MAC addresses derived from slot Id's.

4. The method as set forth in claim 3, wherein said router network is replicated with each engine.

5. The method as set forth in claim 1, further comprising a unique base IP address for each engine network is assigned by the PSIP to create multiple engine configurations.

6. The method as set forth in claim 1, wherein each engine routers MAC address is generated from engine ID programmable logic.

* * * * *